United States Patent
Del Bianco (10) Patent No.: US 10,712,205 B2
(45) Date of Patent: Jul. 14, 2020

(54) FLEXIBLE MULTIPOINT THERMOMETER

(71) Applicant: Endress+Hauser Wetzer GmbH+Co. KG, Nesselwang (DE)

(72) Inventor: Massimo Del Bianco, Monza (IT)

(73) Assignee: Endress+Hauser Wetzer GmbH+Co. KG, Nesselwang (DE)

(*) Notice: Subject to any disclaimer, the term of this patent is extended or adjusted under 35 U.S.C. 154(b) by 270 days.

(21) Appl. No.: 15/745,394

(22) PCT Filed: Jun. 22, 2016

(86) PCT No.: PCT/EP2016/064364
§ 371 (c)(1),
(2) Date: Jan. 16, 2018

(87) PCT Pub. No.: WO2017/009012
PCT Pub. Date: Jan. 19, 2017

(65) Prior Publication Data
US 2019/0011315 A1     Jan. 10, 2019

(30) Foreign Application Priority Data

Jul. 16, 2015 (EP) ..................... 15177002

(51) Int. Cl.
*G01K 7/00* (2006.01)
*G01K 1/00* (2006.01)
(Continued)

(52) U.S. Cl.
CPC ............... *G01K 1/026* (2013.01); *G01K 1/08* (2013.01); *G01K 1/14* (2013.01); *G01K 7/02* (2013.01)

(58) Field of Classification Search
USPC .......................... 374/179, 208, 166, 110, 148
See application file for complete search history.

(56) References Cited

U.S. PATENT DOCUMENTS

| | | | |
|---|---|---|---|
| 2,930,827 A | | 3/1960 | Schunke |
| 4,075,036 A | * | 2/1978 | Lysikov ................. G01K 1/026 136/212 |

(Continued)

FOREIGN PATENT DOCUMENTS

| | | |
|---|---|---|
| CN | 101932358 A | 12/2010 |
| CN | 203432706 U | 2/2014 |

(Continued)

OTHER PUBLICATIONS

Translation of JP 57103025 to Nagano (Year: 1980).*
(Continued)

*Primary Examiner* — Mirellys Jagan
(74) *Attorney, Agent, or Firm* — Christopher R. Powers; Endress+Hauser (USA) Holding Inc.

(57) ABSTRACT

The present disclosure relates to a sensing assembly for sensing a temperature, at least including at least one elongated member, one pre-formed fitting at least partially surrounding the elongated member, and one sleeve member, wherein the elongated member and the pre-formed fitting are positioned within an inner cavity of the sleeve member, and wherein the sleeve member is manufactured such that it is at least partially flexible. The disclosure furthermore relates to a multipoint sensing assembly and to a method for fabrication of a sensing assembly.

20 Claims, 3 Drawing Sheets

(51) Int. Cl.
*G01K 1/02* (2006.01)
*G01K 1/08* (2006.01)
*G01K 1/14* (2006.01)
*G01K 7/02* (2006.01)

(56) References Cited

U.S. PATENT DOCUMENTS

| | | |
|---|---|---|
| 4,251,794 A | 2/1981 | Swenson |
| 4,934,831 A | 6/1990 | Volbrecht |
| 6,650,963 B2 | 4/2003 | Dailey et al. |
| 7,004,626 B1 | 2/2006 | Giberson et al. |
| 2002/0182119 A1* | 12/2002 | Daily ............ G01K 1/026 422/119 |
| 2003/0016730 A1* | 1/2003 | Daily ............ G01K 1/026 374/179 |
| 2012/0076170 A1* | 3/2012 | Lee ............ G01K 1/026 374/179 |
| 2016/0178448 A1* | 6/2016 | Mella ............ G01K 1/08 374/179 |

FOREIGN PATENT DOCUMENTS

| | | |
|---|---|---|
| GB | 1448709 | 9/1976 |
| GB | 2183909 A | 6/1987 |
| JP | 57103025 | 6/1982 |
| JP | 58097631 | 6/1983 |
| WO | 2008016750 A1 | 2/2008 |

OTHER PUBLICATIONS

Search Report for European Patent Application No. 15177002.1, European Patent Office, dated Jan. 20, 2016, 14 pp.
Search Report for International Patent Application No. PCT/EP2016/064364, WIPO, dated Oct. 7, 2016, 19 pp.

* cited by examiner

FLEXIBLE MULTIPOINT THERMOMETER

CROSS-REFERENCE TO RELATED APPLICATIONS

The present application is related to and claims the priority benefit of European Patent Application No. 15177002.1, filed on Jul. 16, 2015 and International Patent Application No. PCT/EP2016/064364 filed on Jun. 22, 2016, the entire contents of which are incorporated herein by reference.

TECHNICAL FIELD

The present invention relates to a sensing assembly and multipoint sensing assembly, e.g. a multipoint probe, i.e. an assembly with multiple measuring points, preferably for sensing a temperature.

BACKGROUND

Sensing assemblies for sensing a process variable, whereas in the case of a temperature is to be sensed, they are given by thermometers or other related devices, are widely applied in the field automation and process techniques. Industrial environment thereby usually requires the sensing assemblies to have properties such as robustness, reliability, and high performance, in particular in case of hazardous process environments including e.g. high pressures and/or temperatures.

A thermometer is usually comprised by a measuring insert with a temperature probe located at its tip protected by a sheath. Additionally, the measuring insert may be inserted in a sleeve member, such as a thermowell, which is in particular done in the case of hazardous process environments. Such sleeve member may also be called protective tube. The temperature sensor itself may e.g. be a resistance thermometer as standardized according to DIN 43735. However, many different temperature sensors and according DIN versions as well as customer specific ones are available on the market and are known in the state of the art.

For example, patent application U.S. Pat. No. 2,930,827 describes a thermometer with thermocouple wires packed in magnesium oxide insulators. The insulators are spaced from each other, form chambers and are arranged in a tubular shield. Other known arrangements comprise inserting one or more temperature sensors into a sheath and embedding it/them in a refractory material which is poured into the sheath as e. g. disclosed in patents GB 2183909 and JP S57103025.

If the process variable, e. g. temperature, is to be sensed at a specific location, i. e. a specific measuring point, inside a large volume (vessel, tank or other) the respective sensor element, e. g. a temperature probe, has to be guided towards that location, usually along a predefined path, e. g. parallel to walls or parallel to other internal structures within the volume. In the case, that more than one measuring points are of interest, a multipoint sensing assembly is needed, comprising a multitude of temperature probes guided to each of the measuring points of interest.

A multipoint measuring assembly for sensing temperature is e. g. described within patent application U.S. Pat. No. 6,550,963 B2. A multipoint thermocouple comprises a sheath having a plurality of conductor pairs disposed within a sheath. This sensing assembly does not feature any sleeve member, so that the sheath of the measuring insert represents the only barrier towards the process environment. For the ability to withstand the process conditions, the sheath is usually chosen to have a rather high thickness in such arrangements. As a consequence, the temperature probe becomes rather rigid making its installation difficult due to frequent necessity of bending it along its length in order to reach the respective measuring point. Furthermore, because the sheath is an integral part of the temperature probe, it might be easily damaged while in direct contact with the process medium. Finally, a replacement in case of failure is not possible.

To overcome such disadvantages, at least one sleeve member may be implemented into the set-up. This leads to a double barrier between the temperature probe and process medium in the form of the sleeve member and the sheath of the measuring insert and thus provides an improved protection of the temperature probe, especially with respect to hazardous media. Because lacking the necessity of a large diameter to withstand heavy process conditions, the measuring insert and/or temperature probe might be constructed flexible making its handling easier.

However, in this concern, the geometry of the at least one sleeve member, as well as the necessary amount of sleeve members to reach all measuring points of interest, depends on their relative distribution, in particular on their spatial distribution, within the vessel or tank. Depending on the actual situation, one of at least two cases may occur: First, all measuring points of interest may be connectable by a more or less straight line, e. g. parallel to the wall of the vessel or tank so that only one sleeve member is needed. In this case, it is possible to construct and manufacture the entire multipoint measuring assembly in a supplier factory before introducing it via an insertion point into the vessel or tank. Alternatively, also the sleeve member may be first introduced and fastened within the vessel or tank and subsequently inserting the measuring insert. In the second much more frequent case, in turn, the measuring points of interest may not be connectable by one more or less straight line but may develop along one or more three dimensional paths proceeding through the interior of the tank or vessel. Then, the installation of the at least one sleeve member needed becomes much more difficult and complex. In particular, the sleeve members usually need to be inserted into the tank or vessel already during its design and/or construction phase. Thereby, the at least one sleeve member hast to be bended and eventually even needs to be constructed by more than one part, whereas the different parts are e. g. welded together to form one sleeve member.

Even though a multipoint measuring assembly comprising at least one sleeve member may enable for a straightforward exchange of the at least one measuring insert including the various temperature probes in case of damage, the sleeve member in the majority of cases needs to be implemented and assembled within the vessel or tank during the design and/or construction phase already. As a consequence, functional testing has to be performed on site after complete installation and eventually subsequent changes are very difficult to carry out.

It is hence an object of the invention to provide a sensing assembly and a multipoint sensing assembly, preferably for sensing temperature, which allows for an easy on-site installation.

SUMMARY

This object is achieved by way of a sensing assembly according to claim 1, a multipoint sensing assembly as claimed in claim 21 and a method for fabrication of such sensing assembly.

The sensing assembly according to the present invention, preferably for sensing a temperature, at least comprises at least one elongated member, preferably for sensing a temperature, one, preferably pre-formed, fitting at least partially surrounding the elongated member, and one sleeve member, wherein the elongated member and the pre-formed fitting are positioned within an inner cavity of the sleeve member, and wherein the sleeve member is manufactured such that it is at least partially flexible.

Said sensing assembly, preferably for measuring temperature, can e.g. be part of a thermometer or a thermometer itself. Hence, it may further comprise a measuring electronics, i.e. a measuring transmitter which serves to transform a signal received via said elongated member, which may at least comprise one temperature probe, into an output signal, which is e.g. in conformity with a standard fieldbus protocol.

During operation the sleeve member may be in contact with a process medium at a specific temperature which is to be determined at least at one point in space, i. e. one specific measuring point. With regards to temperature measurement and robustness a metallic material has proven to be advantageous for the sleeve member. The sleeve member may e.g. be a tube or have a tube shaped form with two open ends or a closed end and an open end. Via an open end of the sleeve member one or more than one pre-formed fittings may be inserted into the sleeve member.

In contrast to a rigid sleeve member, an at least partially flexible one enables bending of the sensing assembly along its length in a straightforward manner if needed, e. g. to guide it along the desired predefined path. Furthermore, by means of an at least partially, preferably fully flexible, sleeve member, the entire manufacturing process of the sensing assembly including functional testing may be completed before installation in a tank, vessel or other. This makes on-site installation much easier, in particular with regards to guidance along a specific predefined path. Besides, subsequent changes concerning the arrangement, e. g. if another location is desired as measuring point, are also possible The pre-formed fitting, the elongated member and the sleeve member may have many different embodiments from which an election is described within the subsequent embodiments of the present invention. They may by arbitrarily combined with each other. Further, it should be noticed, that many more embodiments are possible which are all belong to the present invention.

The terminology "pre-formed" as used for the fitting should be understood such that the fitting is a solid body with a certain shape formed or fixed beforehand. E.g., the fitting may have the shape of a cylindrical block.

In one embodiment of the sensing assembly, the pre-formed fitting is dimensioned or arranged such that it, especially completely, fills the cavity of the sleeve member, i. e. its interior, e. g. between a first height and a second height along the length of the sleeve member.

Depending on the length of the sleeve member it may only be necessary to insert a single pre-formed fitting or it may be required to insert a plurality of fittings in order to fill the interior of the sleeve member—e.g. at least between said two heights along the length of the sleeve member. The fittings may be arranged directly adjacent to one another, i.e. piled on top of each other (stacked), inside the sleeve member, i.e. in its cavity. Furthermore, the multitude of fittings may be identical, i.e. having the same geometry.

In one embodiment of the sensing assembly, the fitting may be made out of a ceramic, preferably a refractory ceramic, material. Alternatively, the fitting may consist of an electrically insulating material, such as e. g. magnesium oxide.

According to another embodiment of the sensing assembly, the at least one fitting has at least one opening or at least one recess, the opening or the recess serving for receiving the at least one elongated member. The opening can for example be a boring fabricated into the massive body of the fitting. However, the fitting might as well comprise a plurality of openings or recesses each of which may serve for receiving an elongated member. One or more of those openings may be an opening extending end-to-end through the fitting. However, some of them might also be a blind-hole.

In case of one or more openings or recesses, each fitting may comprise an equal amount of openings or recesses. However, the fittings as the case may be may also have a different number of openings or recesses, respectively. In particular, the amount of openings or recesses in each fitting may also decrease/increase from one fitting to another along a stacked array of fittings, eventually resulting in the presence of a blind hole.

The at least one fitting may be mechanically connected towards the sleeve member, e. g. by a compression fitting achieved by deforming the sleeve member. Thus, in one embodiment of the sensing assembly the fitting is shattered within the cavity, e. g. by deforming, e. g. pressing or drawing the sleeve member, and wherein the fitting is at least partially, in particular completely, shattered. For instance, the deforming of the sleeve member may comprise pressing and/or drawing of it.

According to one embodiment of the sensing assembly, the elongated member has a rod like form in which at least one sensor element is arranged, preferably at the tip of the elongated member. The elongated member might as well comprise an outer sheath in which the at least one sensor element, is arranged.

Preferably, the elongated member may be connected to the fitting. Hence, in one embodiment, the elongated member is mechanically connected, preferably clamped, e.g. by means of a drawing process, via the shattered and squeezed material the fitting is made out of.

In a further embodiment, the elongated member has a metallic outer sheath, which is filled with an insulating material, and in which the sensor element, and preferably connection wires of the sensor element, are embedded.

In one embodiment, the elongated member is a temperature probe, preferably comprising at least one cable or wire. It is advantageous, if the at least one sensor element then is a thermocouple or a resistance element.

In one embodiment, the tip of the elongated member has a spherical or ogive shape. In particular, the shape of the tip should be such, that it facilitates a straightforward insertion of the elongated member into the sleeve member. In another embodiment, the diameter of the elongated member is smaller than 3 mm, and it is at least partially flexible. Similar to the benefits of special shaping of the tip of the elongated member, handling of a flexible elongated member is more easy than in case of a rigid one, in particular with respect to insertion of the elongated member into the sleeve member.

The elongated member extends along the length of the sleeve member in one opening of the at least one fitting to a certain height along the length of the sleeve member. In another embodiment, in which the at least one fitting has at least two openings, a first elongated member extends to a first height along the length of the sleeve member in a first opening and a second elongated member extends to a second height along the length of the sleeve member in a second opening. In total, multiple fittings may be aligned within one sleeve member, preferably adjacent of each other, and at least one elongated member extends through at least one opening of the at least one fittings.

According to one embodiment of the sensing assembly, the sleeve member is manufactured such that it protects the at least one fitting and elongated member against at least one process condition, e. g. high pressure, temperature, friction or corrosion. Thus, it is the sleeve member which gets into contact with the process medium allowing for more constructive options concerning the elongated member, which might for instance be constructed to be flexible. In total, a double barrier between the sensor element and process medium is achieved by incorporation of the sleeve member.

In one embodiment, the sleeve member serves as a thermowell.

In order to ensure high resistance against the process conditions, the sleeve member may be made of a metallic material. In particular, it may be constructed such that it is completely gastight with a high resistance to heavy process conditions like high pressure or temperature, or friction and/or corrosion. The properties of an at least partially flexible sleeve member regarding its resistance against heavy process conditions should at least be comparable to those exhibited by rigid metallic sleeve members. This is especially importing with respect to oil or gas applications.

With respect to its shape, in one embodiment, the sleeve member is a corrugated flexible tube or hose. Metallic corrugated flexible tubes or hoses can be readily purchased from e.g. MATEC (www.matecindustriale.it), in particular the series PARNOR or HP-THO-XHP, but also from Swagelock (www.swagelock.com) or Parker (www.parker.com).

In one embodiment, the sleeve member is manufactured by means of a hydroforming process. The sleeve member's wall might thereby have close or standard pitch annular corrugations. Depending on the respective construction the tube or hose might be used up to static pressures of several hundreds of bar Preferably, the sleeve member consists of a metallic material, in particular stainless steel or a nickel alloy. In case of stainless steel, temperature resistance to about 600° C. can be reached.

In one embodiment, the sleeve member is reinforced by at least one metallic braid along an outer and/or inner surface area. Such reinforcement serves for a strengthened configuration of the flexible tube or hose.

In another embodiment the sleeve member is sealed at one tip end by means of a welded plug, so that a complete sealing is ensured.

In one embodiment, the sensor element is connected to a process connection by means of a weld.

By way of example for a method for pipe fitting, the at least one sleeve member may have a first diameter, and be at its proximal end connected to a tube having a second diameter larger than the first diameter. Furthermore, the sleeve member may have a first diameter and at its proximal end a second diameter larger than the first diameter. The connection wires of the at least one elongated member may be connected to extension wires at a junction in said tube. The enlarged diameter of the tube or of the sleeve member in its proximal end region then enables an easier access to and fabrication of said junction. In case of multiple elongated members each is connected to extension wires at a correspondent junction in the tube or in the enlarged region with the second diameter of the sleeve member. The tube may be partially or also completely filled with an insulating material, preferably a resin, in which the junctions are embedded. The extension wires, protruding from the tube can then be electrically connected with an already mentioned measuring electronics. Hence, a sensor signal from the sensing assembly may be coupled to the measuring electronics for the purpose of processing or further handling.

The object of the invention is as well achieved by a multipoint sensing assembly, preferably for sensing temperature, comprising at least one sensing assembly according to at least one embodiment of the present invention. The multipoint sensing assembly comprises at least two elongated members and thus at least two sensor elements. In case of a multipoint sensing assembly comprising one sleeve member only, the at least one fitting has at least two openings or recesses in each of which one elongated member may be inserted. Although the at least two elongated members may also extend up to the same height along the length of the sleeve member, in order to provide a multipoint measurement which allows sensing at different locations, e.g. for a 2D or 3D sensing profile, it is preferred that the probes extend up to different heights. In case of at least two sleeve members, at least one of the at least two sleeve member may also only accommodate one elongated member.

In case of a multipoint sensing assembly, the at least two sensor elements can be either equal or of at least two different types.

In at least one opening or recess of a fitting with multiple openings or recesses, also an elongated member in the form of a dummy element, in which no sensor element is arranged, may be placed. The at least one dummy element may have a metallic outer sheath, which is filled e. g. with an insulating material. In particular, regarding mechanical forming, for instance the geometry of the dummy element might be the same as for the elongated member including a sensor element. The dummy element may be made out of the same material as at least one of the elongated members, preferably temperature probes In case the sensing assembly is a temperature sensing assembly, the at least one elongated member is a temperature probe. It can be advantageous, if the at least one temperature probe is embedded to at least 80% of its length inside the opening of the at least one fitting, in order to ensure a perfect guidance throughout the entire length of the sleeve member.

If the at least one fitting has at least two openings, preferably none of the openings remains empty, meaning that in each opening at least one elongated member, preferably a temperature probe, or a dummy element is inserted.

Finally, the object of the present invention is achieved by means of a method for fabrication of a sensing assembly, or a multipoint sensing assembly, according to at least one embodiment of the present invention, preferably for sensing a temperature, at least comprising the steps of: positioning, e. g. inserting, at least one elongated member, preferably for determining temperature, and at least one, preferably preformed, fitting into an inner cavity of an at least partially flexible sleeve member.

Thereby, the embodiments described in connection with the sensing assembly, and multipoint sensing assembly, are mutatis mutandis applicable on the method. For instance, the method for connecting the at least one fitting with the at least one sleeve member and the at least one elongated member, which may be the outer sheath of a temperature probe, may e.g. be a drawing process. The method employed for fixing or arranging the elongated member in said sleeve member may also be at least one of the following: hammering, filing, rolling or swaging of the sleeve member. The connection process may comprise the step of reducing the diameter of the assembly after the at least one fitting and the at least one elongated member are arranged inside, i.e. in the cavity, of the sleeve member. However, any other forming process (which doesn't remove any material) may be employed. When deforming the sleeve member in a manner described above the fitting may also be shattered, i.e. is brought in a pulverulent form. Hence, the cavity of the sleeve member may be filled, preferably completely filled with the residues of the material the fitting is made out of. After positioning, e.g. inserting, said at least one elongated member into the at least one opening or recess of the at least one fitting element, both can be inserted into the sleeve member. However, it is possible to first insert the at least one fitting at least partially into the sleeve member, i.e. into its cavity, and afterwards insert the elongated member into the at least one opening. In this case, said fitting positioned within said cavity, e.g. by deforming said sleeve member may be shattered.

The sensing assembly, especially multipoint sensing assembly according to the present invention, preferably for sensing temperature, can comprise independent sensor elements each embedded in an outer sheath of an elongated member. Conventionally, such sensor elements are embedded in a refractory material which is poured into the outer sheath after one or more elongated members, in particular temperature sensors are inserted into the sheath. Such a platform is disclosed in patents GB 2183909 and JP S57103025. It is an advantage of the present invention that the proposed sensing assembly is even able to work after one fault has occurred, i.e. after the outer sheath of at least one elongated member is broken due to abrasion or an impact, e. g. caused by the process medium. In case of a multipoint assembly comprising multiple elongated members each may be operated independently and hence a fault of one of the sensor elements does not prevent the sensing assembly from further operation. By way of the double barrier in form of the outer sleeve and the outer sheath a high mechanical performances is achieved.

The invention will further be explained on the basis of the following figures. All of them relate to the particular case of a temperature measuring assembly. Yet, the present invention is of course and without restriction also applicable for other types of sensing assemblies, i. e. with elongated members featuring a different sensor unit for sensing a different process variable.

DETAILED DESCRIPTION

Figure 1:
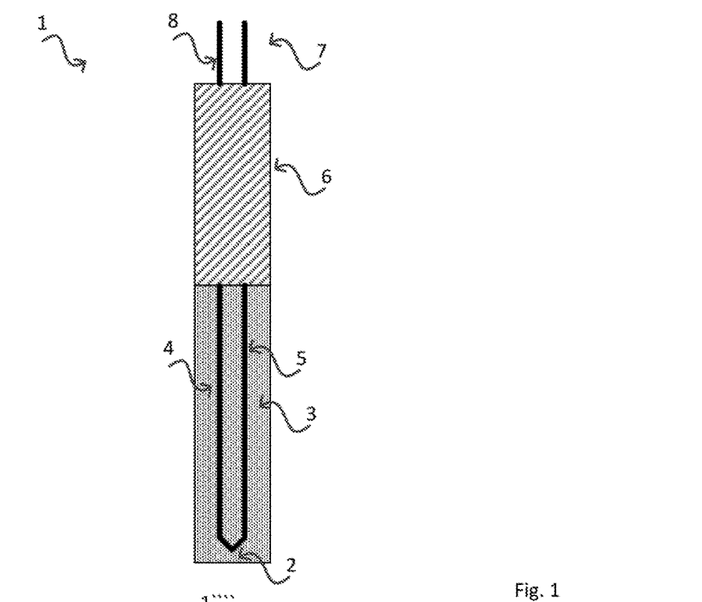
FIG. 1 shows a diagram of a temperature probe, which comprises a thermocouple.

The elongated member in the form of a temperature probe 1 according to FIG. 1 comprises at least one thermocouple with thermo wires 4, 5. These thermo wires 4, 5 are connected at a hot junction 2 at which temperature is to be measured. This specific location should be placed at the desired measuring point within a vessel, tank or other. Here, the thermo wires 4, 5 are embedded within an insulation 3, made of an insulating material. The insulation 3 and the thermo wires 4, 5 in turn are arranged in an outer sheath 6, which has a tubular form. The sheath 6 has a closed end in the vicinity of which the hot junction 6 is arranged. The thermo wires 4, 5 extend from the hot junction 2 through the sheath 6 up to the opposite end of the sheath 6. The thermo wires 4, 5 also protrude from this end of the sheath 6 and are connected to extension wires 7, 8. However, instead of the temperature probe 1 shown any other type of probe may be employed. Also, the invention is not limited to a measuring assembly but may be employed for fabricating any kind of assembly. Also, in general some type of wire or cable may be employed instead of the probe which is shown in FIG. 1. Nevertheless the temperature probe 1 remains a preferred embodiment. In yet another preferred embodiment, the temperature probe may possess a mineral isolated cable (not shown) in which a sensor element is arranged, preferably at its tip.

A sensor signal may be transmitted via sensor wires 4,5 which extend through the cable which in turn may be connected to extension wires 7,8. The connection between the sensor wires and the extension wires may be made within a certain tube section in which a tube may be connected to the isolated cable, e. g. by welding, brazing or crimping.

Figure 2:
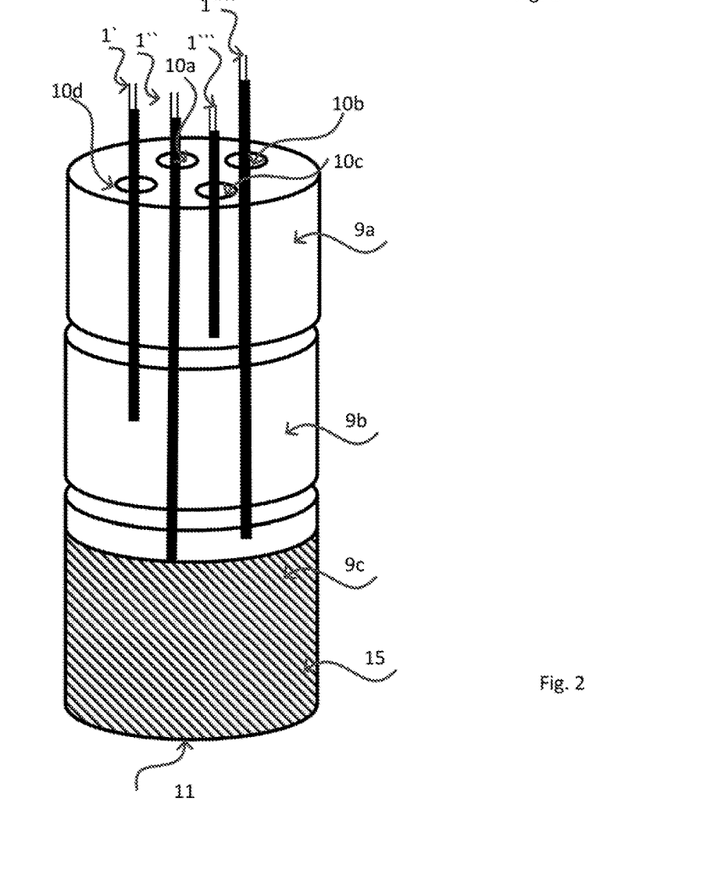
FIG. 2 shows a diagram of multiple fittings, in the form of blocks, into which multiple temperature probes are inserted, to build up an assembly.

FIG. 2 shows an arrangement of multiple fittings 9a,9b,9c and multiple temperature probes 1',1'',1''',1''''. The fittings 9a, 9b, 9c here have the form of cylindrical blocks, and are stapled upon each other to form a tower with four openings 10a, 10b, 10c, 10d each. However, there could be only a single fitting having corresponding openings 10a, 10b, 10c, 10d or even more than the three fittings 9a, 9b, 9c shown. In the present example, the fittings 9a, 9b, 9c are in alignment with each other. Additionally the fittings 9a, 9b, 9c are piled on top of each other so that also corresponding openings lie on top of each other.

Into each of the openings 10a,10b,10c,10d a temperature probe 1',1'',1''',1'''' is inserted. With regard to fitting 9a, this fitting 9a has four openings 10a, 10b, 10c, 10d wherein one them i.e. opening 10c is a blind hole. The adjacent fitting 9b has one opening less, i.e. has three openings 10a, 10b, 10d wherein one of them is a blind hole 10d. The following fitting block 9c has only two openings 10a, 10b, which are blind holes. The blocks are arranged in way that each opening of the fitting 9a, 10a, 10b, 10c, 10d forms a continuous opening with the corresponding openings of the other fittings 9b, 9c in which a temperature probe 1 or other elongated member, such as a cable or wire, can be inserted. The same is true for the blind holes are part of a continuous opening in which another temperature probe, dummy element or other elongated member can be inserted.

All of the fittings 9a, 9b, 9c in FIG. 2 have the shape of a circular cylinder and when stapled upon each other form a longer cylinder with the same base area as the longer cylinder. This cylinder in which the temperature probes or other types of elongated members may already be inserted in is placed in a sleeve member 11. The sleeve member 11 and the fittings 9a, 9b, 9c as well as the temperature probes 1',1'';1''',1'''' therein are subject to a (mechanical) deforming process, e.g. a drawing process. After the drawing the whole assembly the length of the assembly is extended and the diameter is reduced compared to the geometry of the assembly before the drawing process. However the drawing (process) may only stretch the assembly to an extent which won't rupture the wires or other components in the temperature probes 1', 1";1''',1''''. Yet, a region with an enlarged diameter may remain at e.g. the proximal end of the assembly. The distal end 11 of the sensing assembly may also be closed by a cap or end plate, which may be welded to the sleeve member 15 in order to cover the base area of the sensing assembly. The assembly allows temperature monitoring at different locations (linear profile, two or three dimensional profile) using a unique probe. Instead of the thermocouples shown, different types temperature sensors may be employed, e.g. temperature dependent resistors may be employed. The described assembly can be used, for instance, to detect temperature distribution inside a vessel, to monitor chemical reactions, to increase processes efficiency and thus improve quality of final product.

Figure 3:
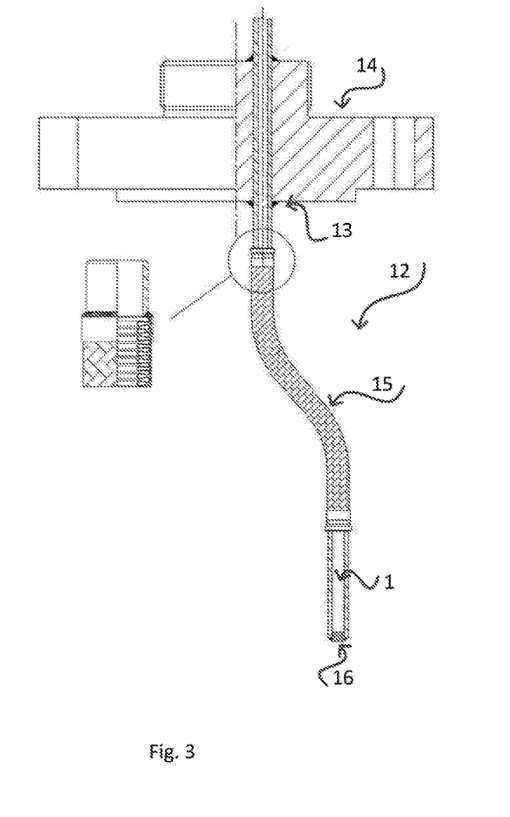
FIG. 3 shows a sensing assembly with an at least partially flexible sleeve member in the form of t corrugated tube connected towards a process connection.

With reference to FIG. 3, at least one sensing assembly 12, welded 13 to a process connection, preferably a remote connection system, 14 is shown. The sensing assembly 12 comprises a sleeve member 15, which is at least partially flexible (see also the detail on the left) and has a sealed end 16 and a single or multitude of temperature probes 1 (not individually drawn) arranged in its interior. Furthermore, in order to guarantee proper mechanical behavior, flexibility and adequate thermal properties, at least one fitting 9 in which the temperature probes are arranged is shattered and pressed surrounding each temperature probe and within the sleeve member 15.

In addition, also a pulverulent material could be employed to guarantee above mentioned properties. The pulverulent material may in that case be inserted into sleeve member 15, e.g. completely filling its cavity, before deforming it. By way of deforming the sleeve member 15 the pulverulent material may be compressed and the probes 1 or elongated members arranged inside the sleeve member 15.

Aim of sleeve member 15 is to contain a single or a plurality of temperature probes 1 in a small volume, having as a result an appropriate compaction rate of internal insulation powder, internal space optimization, flexibility and overall strength. Purpose of sealed end 16 of the sleeve member 15 is to protect internal temperature probes 1 against abrasion, corrosive fluids and mechanical shocks; this can be achieved by way of welding technics, melting deposits, rods or others techniques.

The sleeve member 15 may be filled by a filling material (not shown). Thereby, various different type of filling materials may be used which if necessary, can increase thermal properties close to the measuring points of the respective temperature probes and/or avoiding thermal conductivity between different points along the length of the sleeve member 15. Also, crushable inserts, spacers or solid insulators can be used as a fitting 9, e.g. in the form of a block. In a manufacturing process, at least one fitting and/or filling material may be prepared in advance and inserted with a plurality of temperature probes 1 or other types of elongated members in sleeve member 15, then swaged or drawn. After swaging or drawing, an appropriate insulation, or conductive, material (in powder or solid form) may be filled in the sleeve member 15 before doing the end closure 16 to seal the assembly 12. The result is a double barrier between the process environment and the electric circuits of the temperature probes 1, with high mechanical strength and reliability. The assembly 12 is able to measure temperature values allowing one fault (on sleeve member 15) without affecting all internal temperature probes 1. It should be noticed that various combinations of different sensors and measuring principles can be used for different elongated members 1. A variety of materials also may be used to form sleeve member 15.

Figure 4:
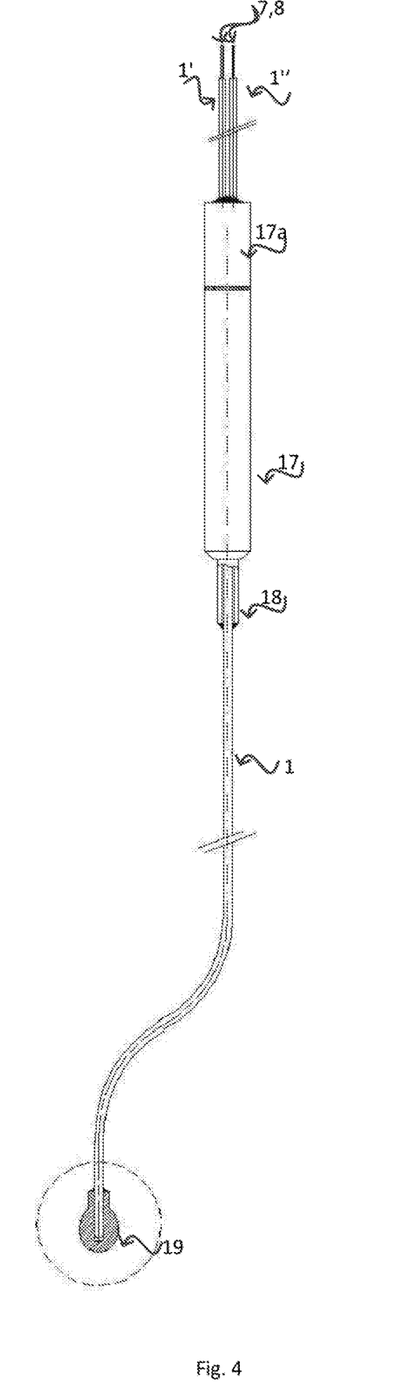
FIG. 4 shows the interior of the sleeve member according to FIG. 3 in more detail.

Finally, in FIG. 4, a possible arrangement for the interior of a flexible sleeve 15 as shown in FIG. 3 is depicted. Exemplarily, two temperature probes 1'; 1" are indicated together with a connection bushing 16 for extension wires 7,8 as described in connection with FIGS. 1 and 2. Again, for simplification in the lower part of FIG. 4, exemplarily one single temperature probe 1 is depicted which is connected to a tube 17 with slightly larger diameter as the outer sheath of the temperature probe 1, which is used for establishing a connection, preferably a welding connection 18. At its opposite end 19 the tip of the elongated member has an ogive shape in order to enable a good sliding of the temperature probe 1 into the sleeve member 15. The tip may as well have a spherical shape or similar.

Figure 5:
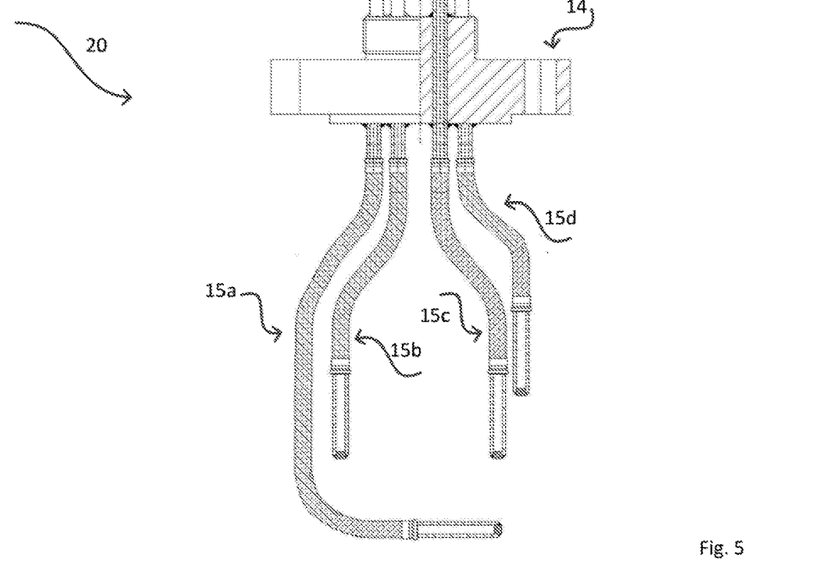
FIG. 5 shows a schematic drawing of a multipoint sensing assembly with four flexible sleeve members.

With a sensing assembly or multipoint sensing assembly according to the present invention, a 2D or 3D temperature profile within a large volume (e. g. vessel, tank or other) can be probed. Identifying each measuring point by proper labeling a temperature profile is obtained due to the plurality of temperature probes 1. Exemplarily, FIG. 5 shows a multipoint thermometer 20 which comprises four at least partially flexible sleeve members 15a, 15b, 15c, 15d. All four flexible sleeve members 15a, 15b, 15c, 15d are mounted via the same process connection 14 and may comprise one or a multitude of temperature probes in order to reach all measuring points of interest.

Figure 6:
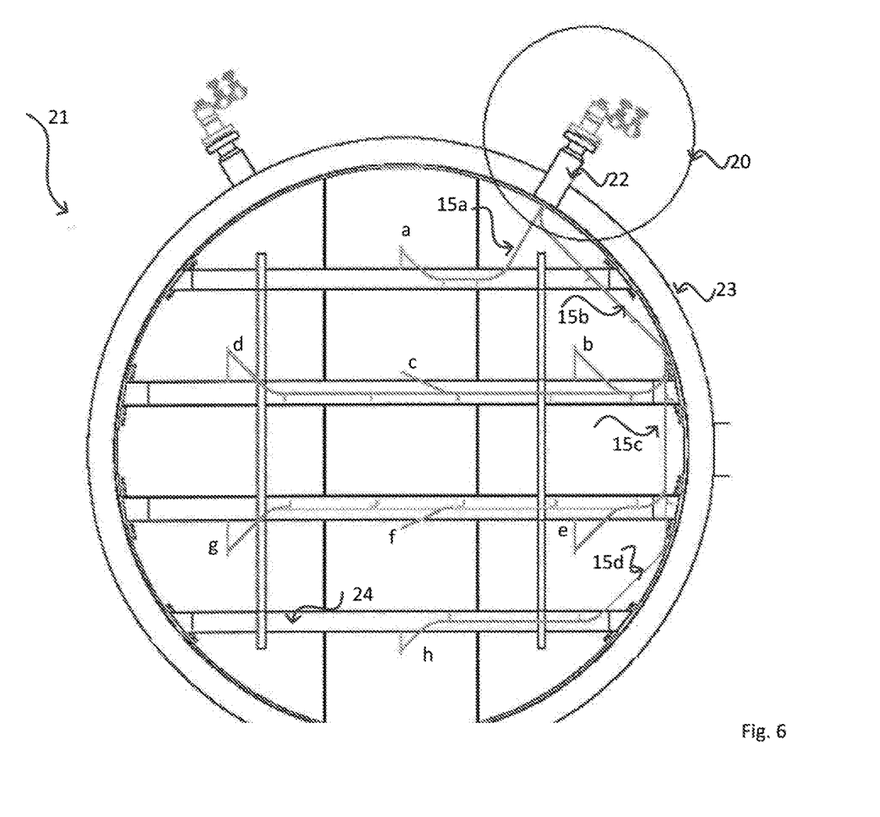
FIG. 6 shows a scheme of the interior of a vessel in which the multipoint sensing assembly according to the present invention and embodied as shown in FIG. 5, is integrated.

FIG. 6 finally shows a schematic drawing of multipoint thermometer 20 mounted on a vessel 21 via a nozzle 22 within the vessel wall 23. The four at least partially flexible sleeve members 15a, 15b, 15c, 15d are guided to specific measuring points a-h within the vessel 21. Thereby, sleeve member 15a in this example has at least one temperature probe 1 for reaching measuring point a, sleeve member 15b features at least three temperature probes 1 for reaching measuring points b-d, while sleeve member 15c is embodied in a similar manner to reach measuring points e-g. Lastly, sleeve member 15d again has at least one temperature probe 1 for reaching measuring point h. Each sleeve member 15a, 15b, 15c, 15d thereby proceeds along a desired and/or predefined path through the vessel and along vessel internal structures 24. In general, within each sleeve member 15, one or multiple measuring points, i.e. one or multiple temperature probes 1 or also dummy elements may be implemented.

The advantage of at least partially flexible sleeve members is given by the possibility of easy and straightforward implementation within a vessel or tank. The multipoint thermometer may be delivered as a whole piece, whereas each sleeve member 15 can be individually guided through the interior of the vessel or tank 21. In case, the desired measuring points change in location, rearrangements are as well possible in a straight forward manner.

The invention claimed is:

1. A sensing assembly for sensing a temperature, comprising:
an elongated member configured to sense a temperature, the elongated member including a sensor element, connection wires connected to the sensor element and a metallic outer sheath filled with an insulating material, wherein the sensor element is embedded in the insulating material such that the connection wires extend from the outer sheath, wherein the elongated member is at least partially flexible;
a fitting at least partially surrounding the elongated member; and a sleeve member configured to be at least partially flexible and to define an inner cavity, wherein the elongated member and the fitting are positioned within the inner cavity of the sleeve member, and wherein the sleeve member is embodied as to protect the fitting and elongated member against a process condition, including high pressure, temperature, friction or corrosion.

2. The sensing assembly of claim 1, wherein the fitting is dimensioned or arranged such that the fitting fills the inner cavity of the sleeve member.

3. The sensing assembly of claim 1, wherein the fitting consists of a refractory ceramic or an electrically insulating material.

4. The sensing assembly of claim 1, wherein the fitting has at least one opening or at least one recess, which is structured to receive the elongated member.

5. The sensing assembly of claim 1, wherein the elongated member has a rod-like form in which at least one sensor element is disposed at a tip of the elongated member.

6. The sensing assembly of claim 1, wherein the at least one sensor element is a thermocouple or a resistance element.

7. The sensing assembly of claim 1, wherein the elongated member is a temperature probe comprising at least one cable or wire.

8. The sensing assembly of claim 1, wherein a tip of the elongated member has a spherical or ogive shape.

9. The sensing assembly of claim 1, wherein a diameter of the elongated member is smaller than 3 millimeters.

10. The sensing assembly of claim 1, wherein a first elongated member extends to a first distance along a length of the sleeve member in a first of at least two openings of the fitting, and a second elongated member extends to a second distance along the length of the sleeve member in a second of the at least two openings of the fitting.

11. The sensing assembly of claim 1, wherein the sleeve member is a corrugated flexible tube or hose.

12. The sensing assembly of claim 1, wherein the sleeve member is manufactured by a hydroforming process.

13. The sensing assembly of claim 1, wherein the sleeve member consists of a metallic material, including stainless steel or a nickel alloy.

14. The sensing assembly of claim 1, wherein the sleeve member is reinforced by at least one metallic braid along an outer and/or inner surface area.

15. The sensing assembly of claim 1, wherein the sleeve member is sealed at one tip end using a welded plug.

16. The sensing assembly of claim 1, wherein the sensor element is connected to a process connection using a weld.

17. The sensing assembly of claim 1, wherein the fitting is at least partially deformed within the inner cavity by pressing or drawing the sleeve member.

18. The sensing assembly of claim 17, wherein the elongated member is mechanically connected to the fitting via the deformed material of the fitting.

19. A multipoint sensing assembly comprising:
  a sensing assembly, the sensing assembly comprising:
    at least one elongated member embodied to sense a temperature, the elongated member including a sensor element, connection wires connected to the sensor element and a metallic outer sheath filled with an insulating material, wherein the sensor element is embedded in the insulating material such that the connection wires extend from the outer sheath, wherein the elongated member is at least partially flexible;
    a fitting at least partially surrounding the elongated member;
    a sleeve member configured to be at least partially flexible and to define an inner cavity, wherein the elongated member and the fitting are positioned within the inner cavity of the sleeve member, and wherein the sleeve member is embodied as to protect the fitting and elongated member against a process condition, including high pressure, temperature, friction or corrosion; and
  a process connection to which the sensing assembly is attached, the process connection configured to accommodate more than one sensing assembly.

20. A method of fabrication of a sensing assembly, the method comprising:
  inserting an elongated member embodied to sense temperature into a pre-formed fitting, the elongated member including a sensor element, connection wires connected to the sensor element and a metallic outer sheath filled with an insulating material, wherein the sensor element is embedded in the insulating material such that the connection wires extend from the outer sheath, wherein the elongated member is at least partially flexible;
  inserting the elongated member and the fitting into an inner cavity of a flexible sleeve member; and
  at least partially deforming the fitting within the inner cavity by pressing or drawing the sleeve member such that the elongated member is mechanically connected to the fitting, wherein the sleeve member is embodied such that it is at least partially flexible.

\* \* \* \* \*